(12) United States Patent
Kimpian

(10) Patent No.: US 9,409,594 B2
(45) Date of Patent: Aug. 9, 2016

(54) POWER STEERING SYSTEM INCORPORATING DOUBLE WAVE SPRING WITH INSULATING INTERMEDIATE LAYER

(71) Applicant: THYSSENKRUPP PRESTA AG, Eschen (LI)

(72) Inventor: Tibor Kimpian, Budapest (HU)

(73) Assignee: THYSSENKRUPP PRESTA AG, Eschen (LI)

( * ) Notice: Subject to any disclaimer, the term of this patent is extended or adjusted under 35 U.S.C. 154(b) by 0 days.

(21) Appl. No.: 14/784,666

(22) PCT Filed: Apr. 1, 2014

(86) PCT No.: PCT/EP2014/056510
§ 371 (c)(1),
(2) Date: Oct. 15, 2015

(87) PCT Pub. No.: WO2014/170125
PCT Pub. Date: Oct. 23, 2014

(65) Prior Publication Data
US 2016/0083006 A1    Mar. 24, 2016

(30) Foreign Application Priority Data
Apr. 15, 2013  (DE) .................. 10 2013 006 432

(51) Int. Cl.
*B62D 5/04* (2006.01)
*F16C 25/08* (2006.01)
(Continued)

(52) U.S. Cl.
CPC ............ *B62D 5/0448* (2013.01); *F16C 25/083* (2013.01); *F16C 19/06* (2013.01); *F16C 2326/24* (2013.01); *F16H 25/2204* (2013.01); *F16H 2025/2445* (2013.01)

(58) Field of Classification Search
CPC ........................... B62D 5/0448; F16C 25/083
See application file for complete search history.

(56) References Cited

U.S. PATENT DOCUMENTS 8,851,227 B2 * 10/2014 Houdayer ............ B62D 5/0448
                                                           180/444
2003/0121714 A1    7/2003  Okada et al.

FOREIGN PATENT DOCUMENTS

DE         1947337 U       10/1966
DE         10202483 A1     8/2003
(Continued)

OTHER PUBLICATIONS

German language International Search Report for International patent application No. PCT/EP2014/056510; mailing date Jun. 25, 2014.
(Continued)

*Primary Examiner* — Kevin Hurley
(74) *Attorney, Agent, or Firm* — thyssenkrugg North America, Inc.

(57) ABSTRACT

The invention relates to a power steering system, in particular for a motor vehicle, comprising a servomotor which drives an axially movable component via a nut mounted in a bearing in a rotatable manner in a frame. The nut is engaged with a threaded spindle formed on the component and is supported axially by the bearing in an elastic manner relative to the frame by means of elastic elements and radially on the frame along a narrow circumferential contact surface. Each wave spring assembly has at least two elements, at least one element of which is a wave spring, and an elastic intermediate layer is arranged between each of the at least two elements.

11 Claims, 3 Drawing Sheets

(51) Int. Cl.
*F16H 25/24* (2006.01)
*F16H 25/22* (2006.01)
*F16C 19/06* (2006.01)

(56) References Cited

FOREIGN PATENT DOCUMENTS

| DE | 10310492 | A1 | 9/2004 |
|---|---|---|---|
| DE | 102004034701 | A1 | 2/2006 |
| DE | 102009019856 | A1 | 11/2010 |
| DE | 102010038715 | A1 | 2/2012 |
| EP | 1571067 | A1 | 9/2005 |
| EP | 2049383 | B1 | 12/2009 |
| WO | 2008017541 | A1 | 2/2008 |
| WO | 2012/079726 | A1 | 6/2012 |

OTHER PUBLICATIONS

English translation of International Search Report for International patent application No. PCT/EP2014/056510; mailing date Jun. 25, 2014.
English translation of abstract of DE 102010038715 A1.
English translation of abstract of DE 102004034701 A1.
English translation of abstract for DE 102009019856 A1.
English translation of abstract of EP counterpart application (EP1457405 A1) to DE10310492 (A1).

* cited by examiner

POWER STEERING SYSTEM INCORPORATING DOUBLE WAVE SPRING WITH INSULATING INTERMEDIATE LAYER

CROSS REFERENCE TO RELATED APPLICATIONS

This application is a U.S. National Stage Entry of International Patent Application Serial Number PCT/EP2014/056510, filed Apr. 1, 2014, which claims priority to German patent application no. DE 102013006432.5 filed Apr. 15, 2013, the entire contents of both of which are incorporated herein by reference.

FIELD

The present disclosure relates to a power steering system, especially for a motor vehicle, having a servomotor that drives an axially movable component via a nut, which nut is rotatably mounted in a bearing disposed in a frame, but which nut is not axially movable.

BACKGROUND

In steering systems with an electric motor servo drive, acting via a ball screw drive, the ball nut is either mounted rotatably and axially rigidly in the housing or the ball nut allows a certain lengthwise and tilting movement thanks to the use of spring elements and special design of the housing or the bearing. A spherical bearing in which both the bearing ring and the frame have a spherical surface is likewise known. In this design, the midpoint of the ball surface is designed to lie in the center plane of the bearing. Similar functions are made possible by spherical roller bearings and self-aligning roller bearings, which tolerate an angular error of the shaft. The goal of these bearings is to even out the tolerance, thereby preventing stresses in the ball screw drive. Moreover, the dynamic and static loading of the structural parts is reduced. The result is improved acoustical properties and reduction in mechanical looseness caused by thermal expansion of the components.

In the described bearing, the problem occurs between the spherical surfaces, just as when using spherical roller bearings and self-aligning roller bearings, that these bearings are more designed for radial forces. But the loads occurring on the ball nut in an electrically assisted steering drive are primarily axially oriented in regard to the steering rack or threaded spindle.

DE 103 10 492 A1 describes a power steering system, especially for motor vehicles, with a servomotor formed as an electric motor, which drives an axially movable component configured as a push rod via a nut which is able to rotate in a frame formed as a steering housing, but unable to move axially. The servomotor, the push rod and the nut are mounted by means of an eccentric bearing ring such that the axial distance between the motor shaft of the servomotor and the push rod is variable, which allows for a quick and easy installation of the power steering system.

An electrical steering device is known from DE 102 02 483 A1, having a toothed rack connected to a steering spindle, a motor to assist a steering force with a rotor arranged coaxially on the toothed rack, a spindle drive in which balls are inserted between a nut keyed to the rotor and a screw formed on the toothed rack, and having a housing which is approximately cylindrical as a whole. The nut of the ball screw mechanism is mounted rotatably in a bearing inside the nut housing section.

DE 1947337 U presents an elastic roller bearing, which has an axial mobility and an axial spring action with restoring force. A roller bearing with an outer race and an inner race, the outer race and/or the inner race each being arranged between at least one dampening element, is known from DE 10 2004 034 701 A1.

EP 1 571 067 A1 discloses the elastic bearing of a worm shaft which coaxially encircles the motor shaft of a servomotor.

The relevant prior art EP 2 049 383 81 shows a solution for enabling or improving the swiveling of a radial bearing. A convex bulge is provided on the outer circumference of the outer race, or the nut on which the inner race sits is provided with a convex bulge. Thanks to the convex bulge of the outer circumference of the outer race or that of the nut, a releasing of the radial bearing and a swiveling of the nut and the axially movable component is achieved. At each end face of the radial bearing there is provided a steel ring on which is vulcanized an element with elastomer properties, making possible an axial and radial dampening as well as a pass through and dampening of the swiveling movement of the axially movable component under alternating loads. When the axially movable component is subjected to bending torque, a seizing of the system should be prevented. The fabrication of the elements used and the installation of the elements are time-consuming. Furthermore, a desirable dampening of the bearing with low installation height is not disclosed in the prior art.

A plate spring arrangement is known from DE 10 2009 019 856 A1 in which at least two coated plate springs form a plate stack, and an elastic intermediate layer is arranged between the coated plate springs, enabling a relative movement of the two plate springs separated by the intermediate layer thanks to shear action. The parallel coupling of the springs can accomplish a force boosting, the springs being preferably elastically coupled and free of friction.

SUMMARY

An object of the present disclosure is to provide a power steering system having a ball nut with a tiltable bearing and which system can be realized with more simple components, is easy to install, and whose dampening of the bearing has a large dampening with low installation height.

BRIEF DESCRIPTION OF THE DRAWINGS

The present disclosure is described in detail below with reference to the attached drawing figures, wherein.

DETAILED DESCRIPTION

Figure 1:
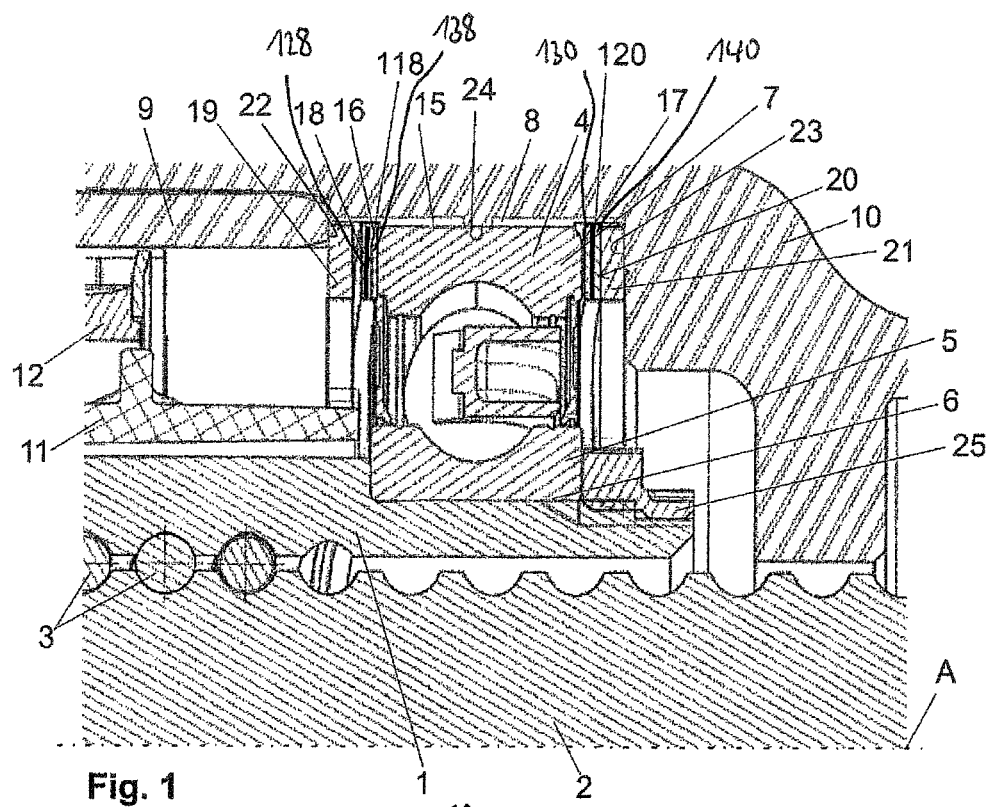
FIG. 1 is a cross-sectional detail view of a bearing of a ball nut in a steering housing having axial bracing against the housing and the housing cover.

A power steering system for a motor vehicle is disclosed herein. The steering system includes a servomotor, which drives an axially movable component via a nut mounted in a bearing in a rotatable manner in a frame. The nut is engaged with a threaded spindle formed on the component and is supported axially by the bearing in an elastic manner relative to the frame by means of elastic elements and radially on the frame along a narrow circumferential contact surface. Each wave spring assembly has at least two elements, at least one of which is a wave spring, and an elastic intermediate layer disposed between each of the at least two elements. An axial equalizing movement of the ball nut under load is made possible, as is a tilting of the ball nut, each time within structurally defined limits. Moreover, the mentioned movements are dampened by the intermediate layer, since this absorbs energy. Finally, at the end of the deformation path of the wave springs, an end stop dampening is achieved, since the metallic wave spring cannot directly strike against the frame or the associated thrust washer, but instead against the intermediate layer.

If a thrust washer is installed each time between the wave spring assemblies and the frame, the material of the wave spring assembly does not need to be adapted to the material of the frame. An especially good spring action results when the wave spring assemblies are arranged each time between an outer race of the bearing and a collar of the frame.

An easy installation of the overall steering gear is made possible when the frame comprises a housing and a housing cover, wherein one of the collars is formed on the housing cover and the other collar is formed on the housing or on a sleeve which can be inserted into the housing.

The free movement of the bearing with respect to a tilting movement under load is improved when the sleeve also has a bearing seat in addition to the collar, which holds the outer race of the bearing against an outer circumferential surface and/or when the bearing seat forms with the outer race a bearing surface which is more narrow in the axial direction of the arrangement than the outer race itself. In an especially simple embodiment, the bearing surface can be configured as an encircling rib. But it can also be provided that the bearing surface is linear as part of a convex surface of the bearing seat facing inward to the bearing.

Advantageously, the wave spring assemblies each have two wave springs, while an elastic intermediate layer is arranged between the two wave springs. The assembly is advantageously configured as a single piece.

It can also be provided that the wave spring assemblies each have a wave spring and a ring, an elastic intermediate layer being arranged between the wave spring and the ring, and the wave spring bearing against the ring at its low points. Especially good dampening properties result when the wave spring has at least one radially continuous cutout at its low points.

Exemplary embodiments of the present disclosure will be explained in further detail below with reference to the attached drawing figures.

FIG. 1 shows a cutout of an electrically operated motor vehicle power steering system in a longitudinal section. The cutout shows the upper half of a longitudinal section along the axis of symmetry A in an area where a ball nut 1 engages with a threaded spindle 2. Between the ball nut 1 and the threaded spindle 2 are arranged balls 3 of a ball circulation system in familiar fashion. The ball nut 1 is mounted in a bearing 4 in rotatable manner. The bearing 4 has an inner race 5, which sits firmly on a bearing seat 6 of the ball nut 1. The bearing 4 moreover has an outer race 7, which is arranged in a bearing seat 8 of a frame. The frame in this embodiment comprises a steering housing 9, fashioned somewhat tubular in shape in this area, being closed by a housing cover 10. The housing cover 10 encloses the steering housing 9 on its outside and is secured to the steering housing 9 by fastening means, not shown.

The ball nut 1 moreover carries an intermediate sleeve 11, on which a belt pulley 12 of a toothed belt drive is secured firmly against twisting. In the context of the present invention, the receiving of the outer bearing race 7 in the bearing seat 8 and especially the bracing in the axial direction of the longitudinal axis A is important. This shall be described more closely below.

The outer bearing race 7, as is customary with roller bearings, is provided with an outer circumferential surface 15, a first end face 16 and a second end face 17. Against the first end face 16 there bears a wave spring assembly 18, which is braced against a thrust washer 19. The second end face 17 is braced accordingly against a wave spring assembly 20, which in turn is braced in the axial direction of the longitudinal axis A against a thrust washer 21. The wave spring assemblies 18 and 20 each have two wave springs 128, 138, 130, 140, between which is arranged an elastic intermediate layer 118, 120. The wave springs 128, 138, 130, 140 are ring-shaped springs having a roughly identical radius, preferably coinciding with the radius of the outer bearing race 7. The wave springs 128, 138, 130, 140 are not flat, but rather have a wavelike shape in side view per FIG. 1. This wavelike shape allows the wave springs 128, 138, 130, 140 to compress in the axial direction between the outer bearing race 7 and the thrust washers 19 and 21. In this process, an elastic deformation occurs, which is reversible and in the resting state positions the outer bearing race 7 in the middle between the thrust washers 19 and 21, as shown in FIG. 1. The wave spring assemblies 18 and 20 are thus components which are not destroyed by heavy loading in the axial direction. Thanks to the elastic intermediate layer, which is preferably a rubber-based elastomer or a viscoelastic substance, a relative motion of the wave springs 128, 138, 130, 140 separated by the intermediate layer is made possible through shear action. This shear action in addition to the coupled elastic elements produces a dampening of the applied force in the axial direction. The thrust washers 19 and 21 are steel rings, preferably being hardened steel. These steel rings are suitable to absorbing the slight movement of the wave spring assemblies 18 and 20 during operation, without the wave springs likewise made of hard material working themselves into the thrust washers 19 and 21. The thrust washers 19 and 21 are therefore used to special advantage when the frame (here, the steering housing 9 and the housing cover 10) is made from a light metal alloy or a similar, relatively soft material.

The design depicted has the thrust washer 19 bearing directly against an end face 22 of the steering housing 9. The second thrust washer 21 bears accordingly against a collar 23 of the housing cover 10, which in the installed state lies opposite the end face 22 at a spacing. In the radial direction, the outer bearing race 7 thrusts with its outer circumferential surface 15 against a web 24 formed circumferentially in the bearing seat 8. The web 24 forms with the outer bearing race 7 a narrow annular encircling bearing surface, enabling a tilting of the outer bearing race 7 with respect to the bearing seat 8 to a slight extent.

Finally, the inner bearing race 5 is secured in its bearing seat 6 by a threaded nut 25, which is screwed onto a corresponding thread of the nut 1.

For the installation, at first the assembly is mounted, being firm against rotation with the nut 1. This assembly comprises the sleeve 11 and the belt pulley 12 as well as the bearing 4. This assembly is then assembled with the wave spring assembly 18 and the thrust washer 19 and inserted into the steering housing 9 until the thrust washer 19 lies against the end face 22 of the steering housing 9. The threaded spindle 2 can be spindled into the nut 1 before or after this assembly process. After this, the wave spring assembly 20 and the thrust washer 21 are placed on the bearing outer race 7 and the housing cover 10 is set in place and fastened to the housing 9 in a flange region, not shown.

In operation, an electric servomotor can now place the belt pulley 12 and thus the nut 1 in rotation via a toothed belt drive, so that the threaded spindle 2 is moved in an axial direction by the balls 3, ultimately bringing about the steering movement for the motor vehicle. The ball nut 1 can move in the bearing seat 8 in the described manner in axial direction against the restoring force of the wave spring assemblies 18 and 20. The narrow bearing surface in the region of the web 24 also enables a slight tilting movement. In this way, dynamic loads can be absorbed, which without this special bearing would result in a heavy loading of the nut 1 and the threaded spindle 2 in the area of the balls 3.

Figure 2:
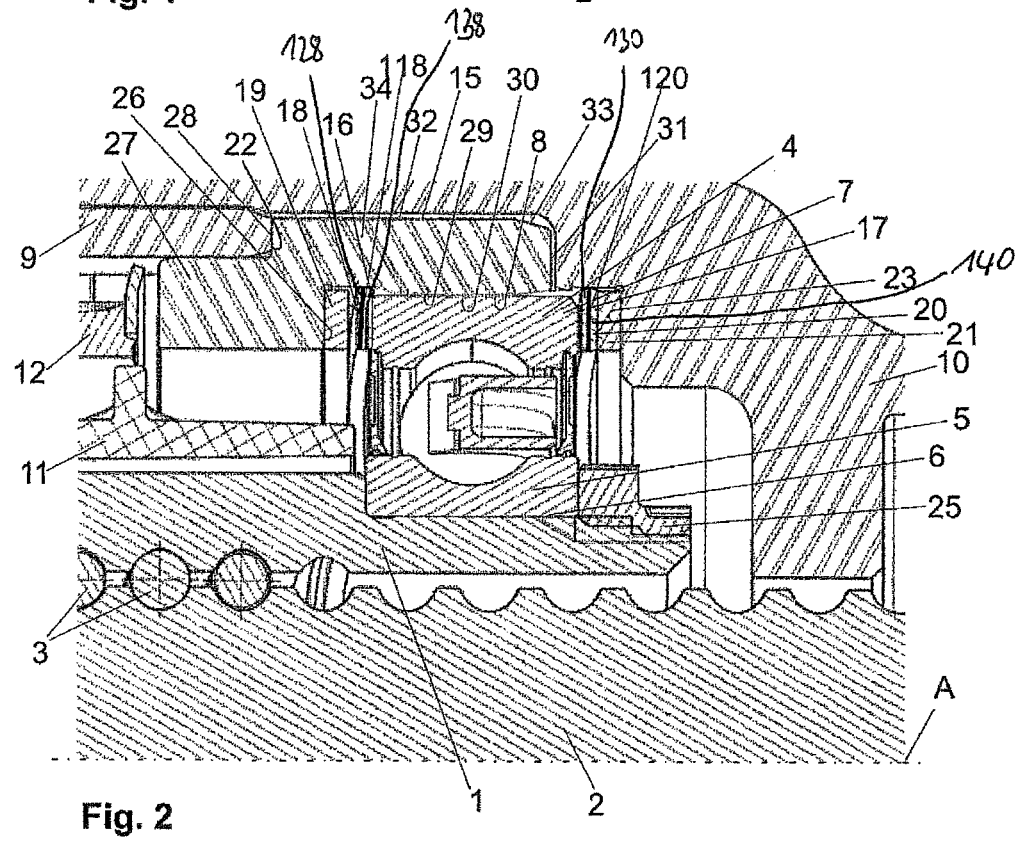
FIG. 2 is a cross-sectional detail view showing the axial bracing of the bearing in an inserted sleeve with a bearing seat having a convex shape.

Another embodiment of the invention is shown in FIG. 2. The bearing 4 in the embodiment of FIG. 2 is smaller in design. Its outer bearing race 7 as in FIG. 1 bears in the axial direction to the right across the wave spring assembly 20 and the thrust washer 21 against the collar 23 of the housing cover 10. In the opposite axial direction, the bearing outer race 7 bears by its end face 16 across the wave spring assembly 18 and the thrust washer 19 against a collar 26, which is formed in a sleeve 27. The sleeve 27 is an essentially tubular part, being articulated into several segments, as shall be described below.

The sleeve 27 has an internal diameter which is large enough so that the ball nut, the intermediate sleeve 11 and the threaded nut 25 can be led through the sleeve 27. A first segment, which is shown at left in FIG. 2, has an external diameter corresponding to the internal diameter of the steering housing 9. The sleeve 27 can be introduced by this segment into the steering housing 9. The external diameter of the sleeve 27 then widens after this segment into a collar 28, so that the collar 28 can bear against the end face 22 of the steering housing 9. The external diameter of the sleeve 27 which is enlarged in another segment corresponds roughly to the outer diameter of the steering housing 9 and the inner diameter of the cover 10 in this region, providing a gap between the sleeve 27 and the housing cover 10.

At the collar 26 in FIG. 2, against which the thrust washer 19 bears, the inner diameter of the sleeve 27 increases from a value corresponding to the inner diameter of the thrust washer 19 to an inner diameter which is greater than that of the thrust washer 19 and also greater than that of the wave spring assembly 18. The wave spring assembly 18 and the thrust washer 19 can thus be introduced into the sleeve 27 until that lies against the collar 26. The outer diameter of the sleeve 27 remains unchanged in this region. At a place which coincides roughly with the position of the left end face 16 of the outer bearing race 7 in the axial direction of the axis of symmetry A there is an inwardly convex region 29 of the sleeve 27. The region 29 is so convex or bulging that, starting from the larger radius in the region of the wave spring 18 it decreases continually in a continuous convex curvature of the radius down to a minimum radius 30 and then increases once more to roughly the value of the larger internal diameter in the region of the wave spring assembly 18. This convex region 29 ends where the sleeve 27 also ends. Here, there is formed an end face 31, which is flat and oriented perpendicular to the axis A. The outside of the sleeve 27 has a purely round cylindrical segment 34, which runs with constant diameter at a slight spacing 32 from the housing cover 10 and which tapers with a chamfer 33 toward the end face 31.

The inner diameter of the sleeve 27 in the region of the smallest radius 30 of the convex region 29 corresponds to the outer diameter of the outer bearing race 7. Since the outer bearing race 7 corresponds geometrically on its outside to a round cylinder with constant diameter, the bearing surface of the outer bearing race 7 is nearly linear in the position shown at the convex region 29. Under loading, the outer bearing race 7 and with it the bearing 4 as well as the entire arrangement of ball nut 1, balls 3 and threaded spindle 2 can move against the restoring force of the wave spring assemblies 18 and 20 in the direction of the axis A. But thanks to the linear bearing against the convex region 29 the outer bearing race 7 can also be tilted in a limited degree. It is therefore ensured that dynamic loads on the nut 1 can be neutralized by a certain mobility of the bearing 4 at their load peaks.

The embodiment of FIG. 2 has the advantage over the embodiment of FIG. 1 that the bearing 4 can be smaller in dimension and that the overall assembly can furthermore be preinstalled primarily thanks to the sleeve 27. In particular, the sleeve 27 prior to being inserted into the steering housing 9 can already accommodate the wave spring assembly 18 and the thrust washer 19 as well as the bearing 4 with the nut 1 mounting inside it and possibly the threaded spindle 2 already screwed on. The inserting of the sleeve 27 into the bearing 9 is easier than the mounting of the embodiment of FIG. 1. The mounting benefit in many instances outweighs the increased expense for the fabrication of the sleeve 27. Alternatively, it is conceivable and possible for the sleeve 27 to be press-fitted by the segment 34 into the housing cover, and accordingly the spacing 32 is not present or it is designed with the corresponding press fit. In this way, the assembly of bearing 4 and the wave spring assemblies 18, 20 as well as the thrust washers 19 can be installed in this alternative embodiment as a preinstalled assembly with the remaining parts of the power steering system of the vehicle. A simplified embodiment calls for the housing 27 to be made from a hard or hardened steel alloy. In this embodiment, which is not illustrated, the thrust washer 19 can be eliminated, so that the wave spring assembly 18 can bear directly against the collar 26 of the sleeve 27. With a suitable choice of material, there is no danger of the wave spring assembly 18 working its way into the material of the sleeve 27 over time. The steering housing 9 and the housing cover 10 can be made as described above from a light metal alloy or also from a suitable plastic.

Figure 3:
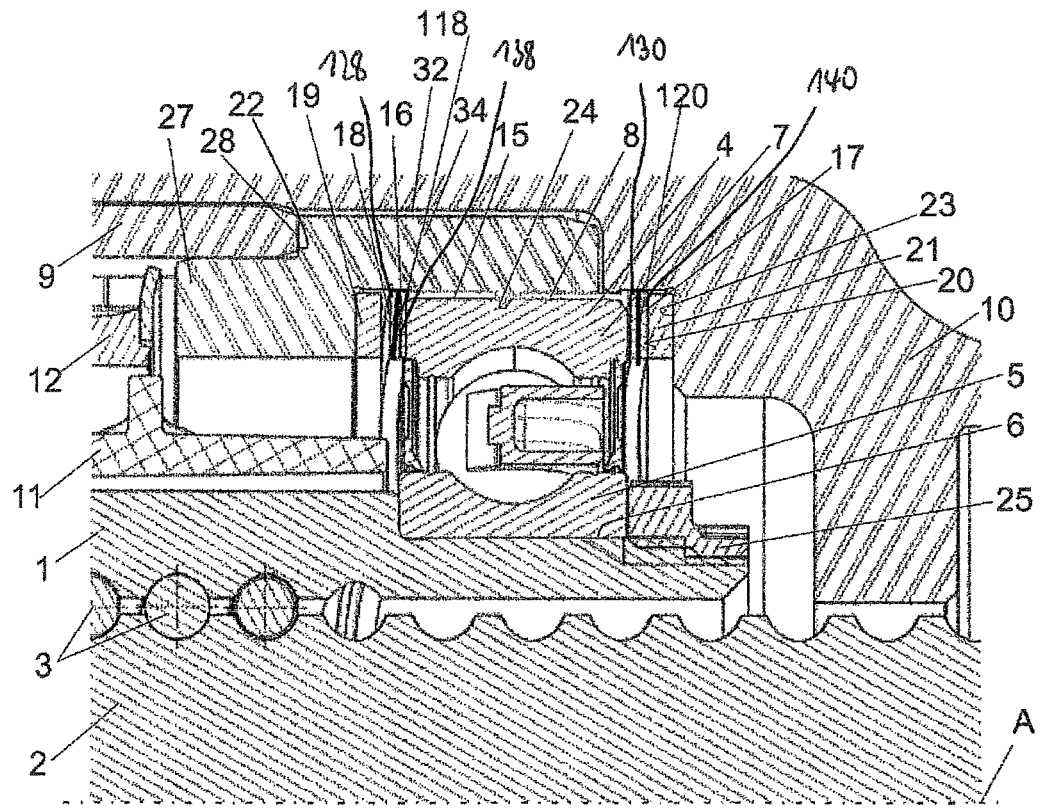
FIG. 3 is cross-sectional detail view of FIG. 2, showing an encircling rib for radial bracing of the outer bearing race.

FIG. 3 shows a third embodiment of the present invention, in which differing from FIG. 1 a sleeve 27 is provided for the mounting of the bearing 4 in the steering housing 9. Accordingly, this embodiment corresponds to the embodiment shown in FIG. 2. Differing from FIG. 2, the sleeve 27 has an inwardly pointing circumferential web 24 in the region of the seat 8 of the bearing 4. Accordingly, the embodiment of FIG. 3 corresponds to the embodiment which was described in FIG. 1 in the region of the bearing seat 8. The installation benefits thanks to the sleeve 27 also are present with the embodiment of FIG. 3. However, the bearing seat 8 with the circumferential web 24 is easier to fabricate than the convex region in the area of the bearing seat as shown in FIG. 2. The web 24 is dimensioned narrow enough to also allow here a slight tilting of the bearing 4 when an external dynamic loading so requires.

FIGS. 4 to 12 show three different embodiments of the wave spring assemblies 18 and 20.

Figure 4:
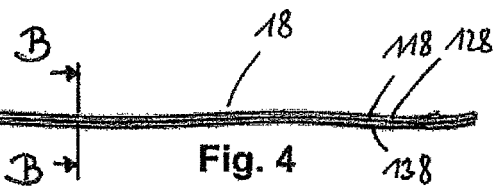
FIG. 4 is a side plan view of a wave spring assembly of the present disclosure.
Figure 5:
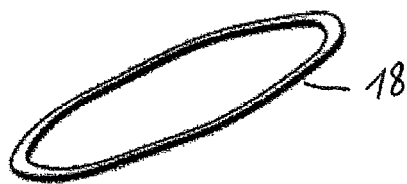
FIG. 5 is an isometric view of the wave spring assembly of FIG. 4.
Figure 6:
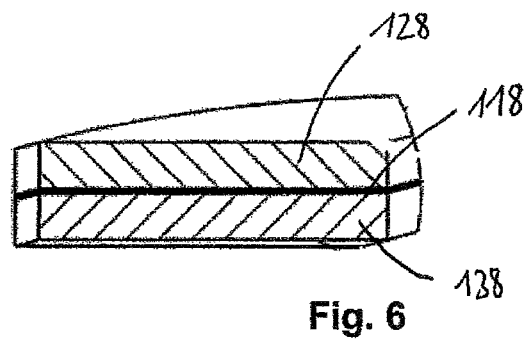
FIG. 6 is a cross-sectional detail view of the wave spring assembly of FIGS. 4 and 5, taken about section line B-B of FIG. 4.

FIGS. 4 to 6 show a wave spring assembly 18, having two parallel arranged wave springs 128, 138 and an elastomer or viscoelastomer intermediate layer 118 between them, in various representations. The parallel wave springs 128, 138 roughly coincide in their diameter, their width and their thickness. They are congruent in shape. The intermediate layer 118 arranged between the wave springs has the same width. The thickness of the intermediate layer 118 is around one seventh of the size of the wave springs 128, 138.

Figure 7:
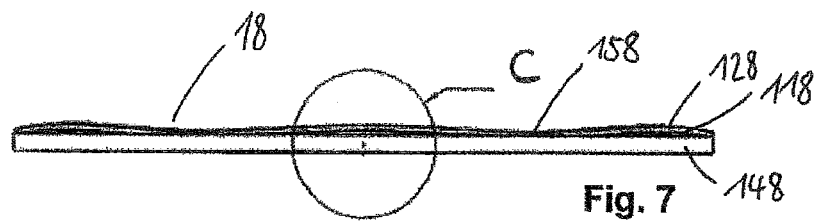
FIG. 7 is a side plan view of an alternate embodiment of a wave spring assembly of the present disclosure.
Figure 8:
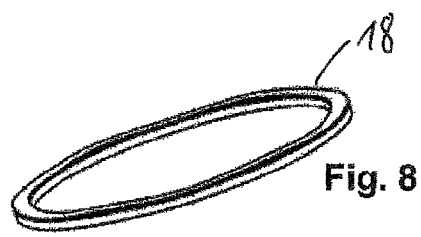
FIG. 8 is an isometric view of the wave spring assembly of FIG. 7.
Figure 9:
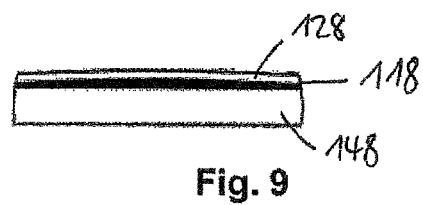
FIG. 9 is a side plan detail view of the wave spring assembly of FIGS. 7 and 8 in a magnified view of detail C from FIG. 7.

A second embodiment of the wave spring assemblies 18 and 20 is shown in FIGS. 7 to 9 in various representations. The wave spring assembly 18 here has one wave spring 128 and a flat ring 148, between which is provided a viscoelastic or elastomer intermediate layer 118. The wave spring 128 and the ring 148 coincide in their diameter and their width. The wave spring 128 and the ring 148 are concentrically arranged. The thickness of the ring 148 is around six times greater than the thickness of the wave spring 128. The intermediate layer 118 has the same width and the same diameter as the ring 148 and the wave spring 128. The thickness of the intermediate layer 118 corresponds on average to roughly the thickness of the wave spring 128. The wave spring 128 is arranged such that its low points 158 bear against the ring 148. By bending of the wave spring 128, shearing stresses are produced in the elastomer during operation, which results in a consumption of energy and thus a dampening action.

Figure 10:
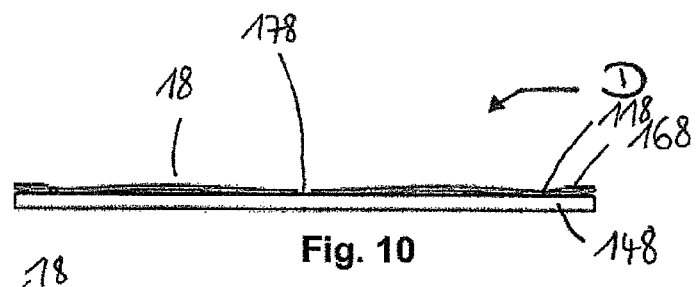
FIG. 10 is a side plan view of an alternate embodiment of a wave spring assembly of the present disclosure.
Figure 11:
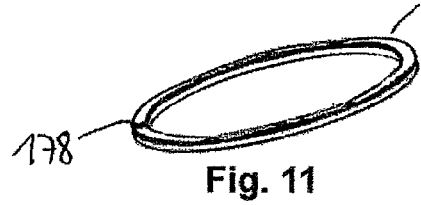
FIG. 11 is an isometric view of the wave spring assembly of FIG. 10.
Figure 12:
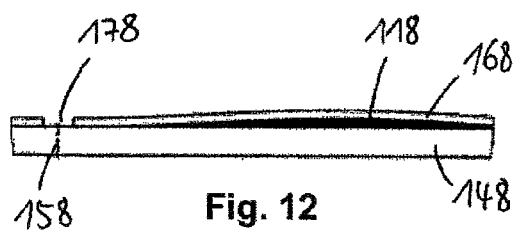
FIG. 12 is a side plan detail view of the wave spring assembly of FIGS. 10 and 11 in a magnified view of detail D from FIG. 10.

FIGS. 10 to 12 show the third embodiment of the wave spring assemblies 18 and 20. The wave spring assembly 18 here has one wave spring 168 and one flat ring 148, between which is arranged a viscoelastic or elastomer intermediate layer 118. The wave spring 168 and the ring 148 coincide in their diameter and their width. The height of the ring 148 is around six times greater than the height of the wave spring 168. The wave spring 128 and the ring 148 are arranged concentrically to each other. The intermediate layer 118 has the same width and the same diameter as the ring 148 and the wave spring 168. The thickness of the intermediate layer 118 corresponds to roughly the thickness of the wave spring 168. The wave spring 168 has at least at one low point, preferably at all its low points 158, a continuous cutout 178 running in the radial direction. If at least two cutouts 178 are provided, the wave spring 168 is thereby divided into several pieces. The cutouts 178 enable a stretching of the wave spring 168 in the radial direction. This causes shear stresses in the elastomer, resulting in a dampening action.

Of course, the mentioned dimension of the wave springs, the intermediate layer and the ring are dimensioned as needed and therefore can depart from the relations mentioned here.

Merely as a precaution it should be mentioned that the rotating parts as well as the sleeve and the internal regions of the steering housing 9 and the housing cover 10 as well as the sleeve 27 are configured essentially rotationally symmetrical to the longitudinal axis A. In particular, the sleeve 27 can be fabricated as a turned part.

In all embodiments it is conceivable and possible for the surfaces which are in frictional contact to be provided with friction-reducing surfaces.

The dampening of the bearing of the ball nut according to the invention thanks to the wave spring assemblies has great rigidity in combination with an advantageous dampening, thanks to the elastic intermediate layer, with very low design height.

LIST OF REFERENCE NUMBERS 1 ball nut
2 threaded spindle
3 ball
4 bearing
5 inner race
6 bearing seat
7 outer race
8 bearing seat
9 steering housing
10 housing cover
11 intermediate sleeve
12 belt pulley
15 circumferential surface
16 end face
17 end face
18 wave spring assembly
19 thrust washer
20 wave spring assembly
21 thrust washer
22 end face
23 collar
24 web
25 threaded nut
26 collar
27 sleeve
28 collar
29 convex region
30 radius
31 end face
32 gap
33 chamfer
34 segment
118 intermediate layer
120 intermediate layer
128 wave spring
130 wave spring
138 wave spring
140 wave spring
148 ring
158 low points of wave spring
168 wave spring
178 cutout of wave spring

The invention claimed is:

1. A power steering system for a motor vehicle, comprising:
 a frame;
 a bearing disposed in said frame;
 a nut rotatably mounted in said bearing and axially supported thereby, and radially supported in said frame along a narrow circumferential contact surface;
 a first and a second wave spring assembly respectively disposed adjacent opposing axial sides of said bearing and configured to elastically support said mounted nut and bearing relative to said frame, each of said first and second wave spring assemblies having at least a first wave spring, a second element, and a an elastic intermediate layer disposed between said first wave spring and said second element;

an axially moveable component disposed in said frame;

a threaded spindle coupled to said moveable component and engaged with said nut; and a servomotor configured to axially drive said axially moveable component by rotation of said nut.

2. The power steering system of claim 1, further comprising a first thrust washer disposed between said first wave spring assembly and said frame, and a second thrust washer disposed between said second wave spring assembly and said frame.

3. The power steering system of claim 1, wherein said first wave spring assembly is disposed between a first side of an outer race of said bearing and a first collar of said frame, and said second wave spring assembly is disposed between a second opposing side of said outer race of said bearing and a second collar of said frame.

4. The power steering system of claim 3, wherein said frame comprises a housing, and a housing cover disposed on said housing, wherein said first collar is formed in said housing cover, and said second collar is formed in at least one of said housing or a sleeve disposed in said housing.

5. The power steering system of claim 4, wherein said sleeve has a bearing seat defined therein that holds said outer race of said bearing against said outer circumferential surface.

6. The power steering system of claim 5, wherein a bearing surface is defined on said bearing seat by a portion of said outer said bearing seat that is in contact with said bearing outer race, wherein said bearing surface is narrower in the bearing's axial direction than a width of said outer race of said bearing.

7. The power steering system of claim 6, wherein said bearing surface is an encircling rib protruding inward from bearing seat toward said outer race of said bearing.

8. The power steering system of claim 6, wherein said bearing seat has a convex surface, and said bearing surface is a linear inner circumferential surface defined on said convex surface of said bearing seat that faces inward toward said outer race of said bearing.

9. The power steering system of claim 1, wherein said second element in each of said first and second wave spring assemblies is a second wave spring, such that each of said wave spring assemblies have a first wave spring and a second wave spring with said elastic intermediate layer being disposed there between.

10. The power steering system of claim 1, wherein said second element in each of said first and second wave spring assemblies is a ring, such that each of said wave spring assemblies have a first wave spring and a ring with said elastic intermediate layer being disposed there between, wherein said wave spring bears against said ring at a plurality of low points on said wave spring.

11. The power steering system of claim 10, wherein said wave spring includes at least one radially continuous cutout located at its low points.

* * * * *